US007145443B2

(12) United States Patent
Ito et al.

(10) Patent No.: US 7,145,443 B2
(45) Date of Patent: Dec. 5, 2006

(54) CASING STRUCTURE OF TRANSMITTER FOR USE IN TIRE CONDITION MONITORING APPARATUS

(75) Inventors: Yoshitaka Ito, Ogaki (JP); Setsuhiro Saheki, Gifu (JP)

(73) Assignee: Pacific Industrial Co., Ltd., Ogaki (JP)

( * ) Notice: Subject to any disclaimer, the term of this patent is extended or adjusted under 35 U.S.C. 154(b) by 0 days.

(21) Appl. No.: 10/697,614

(22) Filed: Oct. 29, 2003

(65) Prior Publication Data

US 2004/0178898 A1 Sep. 16, 2004

(30) Foreign Application Priority Data

Feb. 28, 2003 (JP) ............................. 2003-053172

(51) Int. Cl.
*B60C 23/00* (2006.01)
*B60C 23/02* (2006.01)
(52) U.S. Cl. ................. 340/442; 340/445; 73/146; 73/146.2; 73/146.8; 116/34 R; 137/223; 29/221.5; 141/38; 152/427
(58) Field of Classification Search ................ 340/442, 340/445; 73/146, 146.2, 146.8; 116/34 R, 116/34 A, 34 B; 137/223, 227; 29/221.5; 141/38; 152/427, 429
See application file for complete search history.

(56) References Cited

U.S. PATENT DOCUMENTS 5,844,131 A * 12/1998 Gabelmann et al. ....... 73/146.8

| 6,055,855 | A | * | 5/2000 | Straub ....................... 73/146.8 |
| 6,101,870 | A | * | 8/2000 | Kato et al. ................. 73/146.8 |
| 6,160,474 | A | * | 12/2000 | Tsunetomi et al. .......... 340/442 |
| 6,163,255 | A |  | 12/2000 | Banzhof et al. |
| 6,481,083 | B1 |  | 11/2002 | Lawson et al. |
| 6,568,259 | B1 | * | 5/2003 | Saheki et al. ................. 73/146 |
| 6,591,672 | B1 | * | 7/2003 | Chuang et al. ............ 73/146.8 |
| 2004/0163456 | A1 | * | 8/2004 | Saheki et al. ............... 73/146.8 |

FOREIGN PATENT DOCUMENTS

| JP | 32-6 | 1/1957 |
| JP | 2000-81358 | 3/2000 |

OTHER PUBLICATIONS

"Tyre Valves for Automobiles," *JIS Handbook 2001*, (*18*) *Automobiles-Parts & Components*, JIS D4207, pp. 1400-1408.

* cited by examiner

*Primary Examiner*—Jeffery Hofsass
*Assistant Examiner*—Samuel J. Walk
(74) *Attorney, Agent, or Firm*—Crompton, Seager & Tufte, LLC

(57) ABSTRACT

A transmitter is mounted on a wheel of a vehicle by a jig of an automatic mounting machine. The transmitter has a measuring-transmitting portion, a valve stem, and a casing. The measuring-transmitting portion measures data representing the conditions of the tire and transmits data. The valve stem is inserted into the wheel and allows air to flow into the tire. The casing accommodates the measuring-transmitting portion, and has a recessed portion. The jig of the automatic mounting machine is engaged with the recessed portion when the automatic mounting machine holds the valve stem. Therefore, even a valve stem with the casing is easily attached to a valve hole of the wheel by using the automatic mounting machine.

8 Claims, 2 Drawing Sheets

CASING STRUCTURE OF TRANSMITTER FOR USE IN TIRE CONDITION MONITORING APPARATUS

BACKGROUND OF THE INVENTION

The present invention relates to a tire condition monitoring apparatus and, more particularly, to a casing structure in a wireless-communication-type tire condition monitoring apparatus which enables tire conditions including the air pressure in a tire to be checked from the interior of a vehicle.

Snap-in valves in which a valve stem and rubber are formed integrally with each other under vulcanization conditions have been frequently used as vehicle tire valves. When a snap-in valve is mounted, an end portion of the valve stem is first passed through a valve hole from the inside of a wheel, with a valve cap screwed on the extreme end portion of the valve stem. The snap-in valve is then press-fitted in the valve hole. A sealing surface formed in a peripheral direction at the base end of the snap-in valve is thereby placed in the valve hole. As a result, the sealing surface adheres to the surface of the valve hole to maintain airtightness of the tire. (See Japanese Utility Model Publication No. 32-6 or a document from Japanese Standards Association "JIS Handbook, 2001, (18) Automobiles-Parts & Components", JIS D4207, Tyre Valves for Automobiles, pp. 1400–1408).

Other vehicle tire valves heretofore used include clamp-in valves. In the case of mounting of a clamp-in valve, an end portion of the valve stem is passed through a valve hole of a wheel from the inside of the wheel, and the valve stem is fixed in the valve hole of the wheel by a valve nut fitted from the outside of the wheel.

In a case where the valve stem is mounted in a valve hole by using an automatic mounting machine, the above-described operation is performed by the automatic mounting machine while the base end of the valve stem is held by a jig.

Japanese Laid-Open Patent Publication No. 2000-81358 discloses a wireless-communication-type tire condition monitoring apparatus for checking the conditions of tires mounted to a vehicle from the interior of the vehicle. The tire condition monitoring apparatus has a plurality of transmitters attached to wheels in combination with the tires, and a receiver provided on a body of the vehicle. Each transmitter measures the conditions of the corresponding tire including the air pressure and the temperature in the tire to obtain data indicating the measured tire conditions, and transmits the data to the receiver by wireless communication. A casing for accommodating the transmitter is provided on the base end of the valve stem.

There has been a problem that when the valve stem provided with the casing is mounted in the valve hole by an automatic mounting machine, the base end of the valve stem cannot be held by a jig because the casing obstructs holding of the valve stem by the automatic mounting machine.

SUMMARY OF THE INVENTION

An object of the present invention is to provide a casing structure of a transmitter for use in a tire conditioning monitoring apparatus which enables the valve stem to be mounted to a wheel by using an automatic mounting machine.

To achieve the above-described object, the present invention provides a transmitter for use in a tire condition monitoring apparatus. The transmitter is mounted in a wheel of a vehicle by an automatic mounting machine. The automatic mounting machine has a jig. The transmitter has a measuring-transmitting portion, a valve stem and a casing. The measuring-transmitting portion measures data representing the conditions of a tire mounted on the wheel, and transmits data indicating the condition of the tire. The valve stem is inserted into the wheel and allows air to flow into the tire. The casing accommodates the measuring-transmitting portion. The casing has an engagement portion. The jig of the automatic mounting machine engages with the engagement portion during mounting.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A casing structure of a transmitter 1 for use in a tire condition monitoring apparatus in an embodiment of the present invention will be described with reference to FIGS. 1 and 2.

Figure 1:
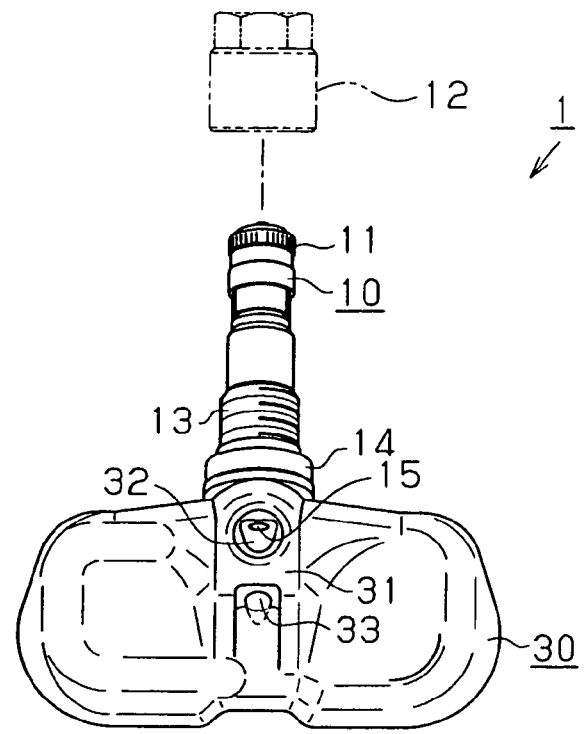
FIG. 1 is a plan view of a transmitter for use in a tire condition monitoring apparatus in an embodiment of the present invention.
Figure 2:
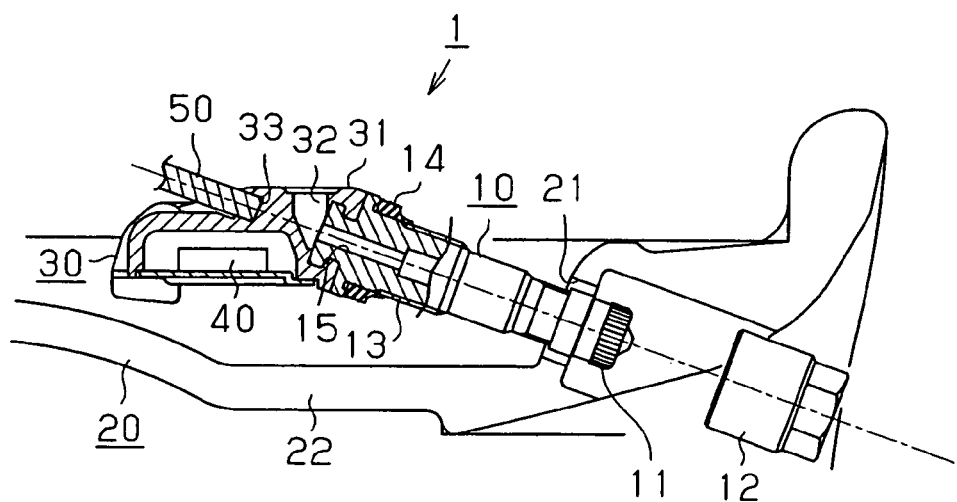
FIG. 2 is a diagram for explaining operations performed to mount the transmitter shown in FIG. 1 to a wheel.

As shown in FIGS. 1 and 2, a valve cap 11 is screwed on the end portion of a valve stem 10. On the valve stem 10, a fixing portion 13 is formed for fixing the valve stem 10 in a valve hole 21 of a wheel 20 in such a manner that a valve nut 12 is screwed on the fixing portion 13 from the outside. The tire valve of this embodiment is a clamp-in valve. The diameter of the fixing portion 13 is larger than that of the valve cap 11. Therefore, the end portion of the valve stem 10 can be passed through the valve nut 12 to enable the valve nut 12 to be screwed on the fixing portion 13 even in a state where the valve cap 11 is screwed on the end portion of the valve stem 10. A grommet 14 which is brought into contact with the inner surface of the valve hole 21 of the wheel 20 to maintain airtightness for enclosing air in the tire is attached to a lower section of the fixing portion 13. An air hole 15 for filling the tire with externally supplied air is formed in the valve stem 10 from the extreme end to the base end.

On the base end of the valve stem 10, a casing 30 to be accommodated in the tire is provided. The casing 30 has a generally rectangular shape. A measuring-transmitting unit 40 is accommodated in the casing 30. The measuring-transmitting unit 40 measures tire conditions including the air pressure and the internal temperature in the tire to obtain data indicating the measured tire conditions, and transmits the data to a receiver (not shown) by wireless communication. At a center of the casing 30 to which a prolongation of the center axis line of valve stem 10 extends, the casing 30 has a bulging portion 31 which bulges out relative to opposite end portions of the casing 30. At a center of the raised portion 31, an air hole 32 is formed for filling the tire with air supplied through the air hole 15 in the valve stem 10. Air supplied through the air hole 15 in the valve stem 10 is introduced into the tire through the air hole 32.

At the center of the bulging portion 31 and on the prolongation of the center axis line of the valve stem 10 (indicated by the dot-dash line in FIG. 2), a recessed portion 33, which is an engagement portion, is formed. A jig 50 of an automatic mounting machine (not shown) contacts the recess 33, and the recess 33 engages with the casing 30. The valve stem 10 with the casing 30 is held by the jig 50 of the automatic mounting machine. In a state where the valve stem 10 is held, the end portion of the valve stem 10 is passed through the valve hole 21 of the wheel 20 from the inside of the wheel 20. Thereafter, the valve nut 12 is screwed on the fixing portion 13 by the automatic mounting machine or a worker. As a result, the valve stem 10 with the casing 30 is thereby mounted in the valve hole 21 of the wheel 20. At this time, the casing 30 is brought into contact with a drop center portion 22 of the wheel 20. Therefore, the casing 30 is not spaced apart from the drop center portion 22 of the wheel 20 even when a centrifugal force is applied to the casing 30 by the rotation of the tire during traveling of the vehicle.

This embodiment has the advantages described below.

In the casing 30, on a prolongation of the center axis line of the valve stem 10, the recessed portion 33 is formed with which the jig 50 of the automatic mounting machine engages the casing 30. At the time of mounting of the valve stem 10, the valve stem 10 with the casing 30 is held by the jig 50 of the automatic mounting machine. Thus, even the valve stem 10 with the casing 30 can be mounted in the valve hole 21 of the wheel 20 by using the automatic mounting machine.

Each of the valve stem 10 with the casing 30 and the valve stem 10 without the casing 30 can be mounted in the valve hole 21 of the wheel 20 by using the jig 50 of some of the existing automatic mounting machines. Thus, good use can be made of the existing automatic mounting machines, and there is no possibility of the cost of capital spending being increased even in the case of mounting the valve stem 10 with the casing 30 in the valve hole 21 of the wheel 20.

On a prolongation of the center axis line of the valve stem 10, the recessed portion 33, with which the jig 50 of the automatic mounting machine engages, is formed on the casing 30, so that the center axis line of the jig 50 of the automatic mounting machine and the center axis line of the valve stem 10 coincide with each other. As a result, the end portion of the valve stem 10 can be easily passed through the valve hole 21 of the wheel 20 and therefore, the valve stem 10 can be easily mounted in the valve hole 21 of the wheel 20.

The above-described embodiment can be implemented by being modified as described below.

It should be apparent to those skilled in the art that the present invention may be embodied in many other specific forms without departing from the spirit or scope of the invention. Particularly, it should be understood that the invention may be embodied in the following forms.

Figure 3:
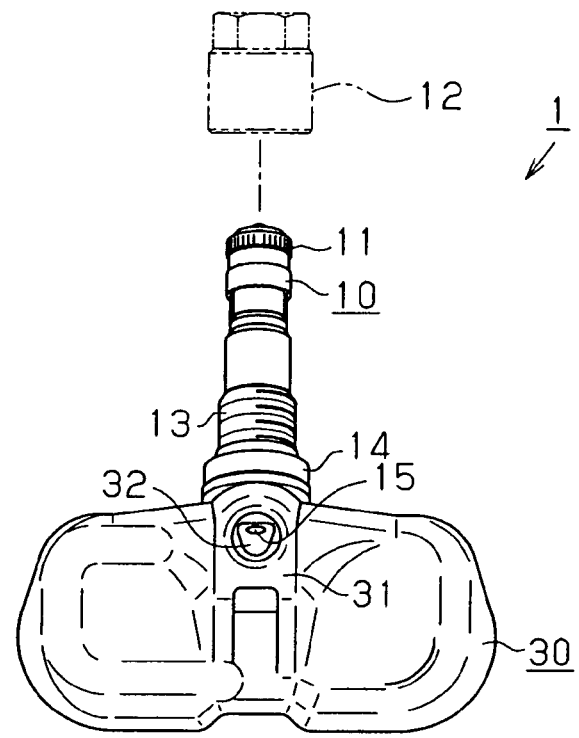
FIG. 3 is a plan view of a transmitter for use in a tire condition monitoring apparatus in another embodiment of the present invention.
Figure 4:
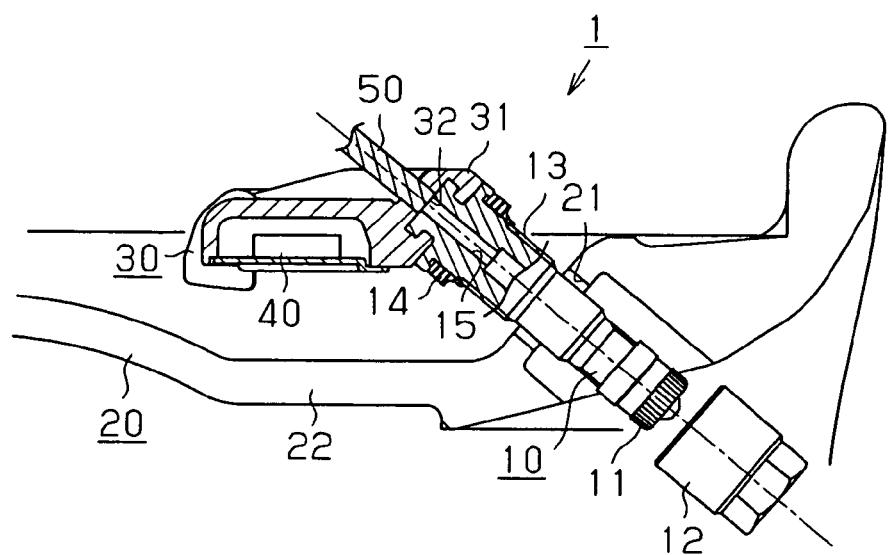
FIG. 4 is a diagram for explaining operations performed to mount the transmitter shown in FIG. 3 to a wheel.

An arrangement may be adopted in which, as shown in FIGS. 3 and 4, the air hole 32 formed at the center of the bulging portion 31 functions as the recessed portion 33 in the above-described embodiment. That is, the air hole 32 may be formed in the casing 30 on a prolongation of the center axis line of the valve stem 10 so as to have both the function of the air hole 32 and the function of the recess 33.

It is preferred that the recessed portion 33 held by the jig 50 of the automatic mounting machine should have such a shape that the rotation of the valve stem 10 with the casing 30 is limited, for example, an elliptical shape, a triangular shape, a rectangular shape, a star shape, or the like. The recessed portion 33 may have the shape of a true circle if an arrangement for limiting the rotation of the valve stem 10 is used.

The recessed portion 33 in the above-described embodiment is replaced with a projecting portion if the jig 50 of the automatic mounting machine is formed so as to have a recessed shape.

The above-described embodiment may be applied to a snap-in valve having a casing 30.

When the valve stem 10 is mounted to the wheel 20 by using the automatic mounting machine, the valve cap 11 screwed on the end of the valve stem 10 may be used for positioning of the valve stem 10 with respect to the valve hole 21.

The present examples and embodiments are to be considered as illustrative and not restrictive and the invention is not to be limited to the details given herein, but may be modified within the scope and equivalence of the appended claims.

The invention claimed is:

1. A transmitter for use in a tire condition monitoring apparatus in which the transmitter is mounted in a wheel of a vehicle by an automatic mounting machine, wherein the automatic mounting machine has a jig, the transmitter comprising:

a measuring-transmitting portion, which measures data representing the conditions of a tire mounted on the wheel, and transmits data indicating the condition of the tire;

a valve stem, which is inserted into the wheel for allowing air to flow into the tire, the valve stem having a base end; and a casing for accommodating the measuring-transmitting portion, the casing being fixed to the base end of the valve stem, the casing having a recessed engagement portion, wherein the jig of the automatic mounting machine engages with the recessed engagement portion during mounting;

wherein the recessed engagement portion has a shape such that rotation of the casing relative to the jig is limited when held by the jig.

2. The transmitter according to claim 1, wherein the recessed engagement portion is located on an extension of a center axis line of the valve stem.

3. The transmitter according to claim 2, wherein the casing has an air hole that allows air to flow into the tire through the valve stem.

4. The transmitter according to claim 3, wherein the air hole serves as the engagement recessed portion.

5. A transmitter for use in a tire condition monitoring apparatus in which the transmitter is mounted in a wheel of a vehicle by an automatic mounting machine, wherein the automatic mounting machine has a jig, the transmitter comprising:

a measuring-transmitting portion, which measures data representing the conditions of a tire mounted on the wheel, and transmits data indicating condition of the tire;

a valve stem, which is inserted into the wheel and allows air to flow into the tire, the valve stem having a base end and a casing for accommodating the measuring-transmitting portion, the casing being fixed to the base end of the valve stem, wherein the casing has a recessed portion, wherein the jig of the automatic mounting machine engages with the recessed portion during mounting, wherein the recessed portion is located on an extension of a center axis line of the valve stem so tat a center axis line of the jig coincides with the center axis line of the valve stem when the jig engages with the recessed portion, and wherein the recessed portion has a shape such that rotation of the casing relative to the jig is limited when held by the jig.

6. The transmitter according to claim 5, wherein the recessed portion has an air hole that allows air to flow into the tire through the valve stem.

7. The transmitter according to claim 5, wherein, when the jig engages with the engagement portion, the casing is prevented from being rotated.

8. The transmitter according to claim 5, wherein the air hole serves as the recessed portion.

* * * * *

UNITED STATES PATENT AND TRADEMARK OFFICE
CERTIFICATE OF CORRECTION

PATENT NO.       : 7,145,443 B2                                              Page 1 of 1
APPLICATION NO.  : 10/697614
DATED            : December 5, 2006
INVENTOR(S)      : Yoshitaka Ito et al.

It is certified that error appears in the above-identified patent and that said Letters Patent is hereby corrected as shown below:

Column 5
Line 7, delete "tat" and insert therefor -- that --.

Signed and Sealed this

Twentieth Day of February, 2007

JON W. DUDAS
*Director of the United States Patent and Trademark Office*